(12) United States Patent
Yamamoto et al.

(10) Patent No.: US 6,890,685 B2
(45) Date of Patent: May 10, 2005

(54) ANODE FOR SECONDARY BATTERY AND SECONDARY BATTERY THEREWITH

(75) Inventors: Hironori Yamamoto, Tokyo (JP); Jiro Iriyama, Tokyo (JP); Tamaki Miura, Tokyo (JP); Mitsuhiro Mori, Tokyo (JP); Koji Utsugi, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 10/103,701

(22) Filed: Mar. 25, 2002

(65) Prior Publication Data

US 2003/0054249 A1 Mar. 20, 2003

(30) Foreign Application Priority Data

Mar. 27, 2001 (JP) ........................................ 2001-090169

(51) Int. Cl.⁷ ................................................ H01M 4/58
(52) U.S. Cl. ................ 429/218.1; 429/231.8; 429/231.95; 429/128
(58) Field of Search .................. 429/231.1, 218.1, 429/128, 144, 231.95, 231.8, 231.4

(56) References Cited

FOREIGN PATENT DOCUMENTS

| JP | 5-234583 | 9/1993 | |
|---|---|---|---|
| JP | A 7-288123 | 10/1995 | |
| JP | A 7-326342 | 12/1995 | |
| JP | 9-259868 | 10/1997 | |
| JP | 10-3904 | 1/1998 | |
| JP | 10-3920 | 1/1998 | |
| JP | 10-003920 | * 1/1998 | ............ H01M/4/58 |
| JP | 11-7944 | 1/1999 | |
| JP | 11-135120 | 5/1999 | |
| JP | A 11-283627 | 10/1999 | |
| JP | 2000-90916 | 3/2000 | |
| JP | A 2001-68110 | 3/2001 | |
| JP | A 2001-283833 | 10/2001 | |
| JP | A 2002-15729 | 1/2002 | |
| WO | WO96-33519 | 10/1996 | |

* cited by examiner

Primary Examiner—Stephen Kalafut
Assistant Examiner—Raymond Alejandro
(74) Attorney, Agent, or Firm—Young & Thompson

(57) ABSTRACT

This invention relates to an anode for a secondary battery capable of occluding and releasing lithium ions, the anode having a multi-layer structure comprising: a first layer containing carbon as a main component; and a second layer as a main component containing a lithium-occluding material film, the film capable of occluding lithium more than a theoretical lithium-occlusion capacity for carbon, as well as a secondary battery using the anode. This invention can provide a secondary battery with a substantially improved battery capacity in a range where the battery is actually used, while having a higher charge-discharge efficiency and good cycle properties.

21 Claims, 14 Drawing Sheets

Thickness of the second anode / Thickness of the carbon anode × 100

Thickness of the oxide film (nm)

Total thickness of the second anode and the oxide film / Thickness of the carbon anode × 100 a : Carbon
b : Two-layer structure where an Sn layer is deposited on a carbon layer
c : Sn-particle surface coated with carbon
d : Sn

ANODE FOR SECONDARY BATTERY AND SECONDARY BATTERY THEREWITH

BACKGROUND OF THE INVENTION

1. Field of the Invention

This invention relates to a secondary battery and an anode for a secondary battery.

2. Description of the Prior Art

As mobile terminals such as a cellular phone and a note-type personal computer have become widespread, a battery as their power source has become more important. Such a battery must be small and light-weight while having a higher capacity and must exhibit a property that it is tolerant to degradation due to repetitive discharging and charging.

Lithium metal is sometimes used as an anode in the light of its higher energy density and light-weight. However, as a charge-discharge cycle is repeated, needle crystals (dendrites) are deposited on a lithium surface. Finally, these crystals penetrate a separator to cause internal short-circuit, leading to a reduced battery life. When using a carbon material capable of occluding and releasing lithium ions as an anode, precipitation of needle crystals is not observed and a charge-discharge cycle can be successfully repeated. The carbon material may have a capacity smaller by about one order than lithium metal.

There have been, therefore, many attempts for improving an anode capacity.

JP-A 9-259868 has disclosed that metal powder such as copper, chromium and titanium incapable of forming an alloy with an alkali metal may be added to an anode to improve conductivity, reduce cycle degradation and improve an efficiency of a carbon material, and that conductivity and a capacity can be improved by using a carbon material supporting fine powder of a metal such as aluminum, lead and silver capable of forming an alloy with an alkali metal.

JP-A 2000-90916 has disclosed an anode active material in which powders of a metallic material (reduced material) made by heating ultra-fine particles of, for example, silica, alumino-silica, tin oxide and a composite metal oxide of tin oxide and antimony oxide are coated with a carbonaceous material. JP-A 10-3920 has disclosed an anode active material comprising fine particles which is made of at least one element selected from Mg, Al, Si, Ca, Sn and Pb and on whose surface a carbonaceous material layer is formed. It has been described that such an anode active material may be used to prepare a secondary battery with a higher capacity which is tolerant to cycle degradation.

Domestic re-publication of PCT international publication WO 96/33519 has disclosed the use of an amorphous oxide comprising at least one functional element selected from Sn, Mn, Fe, Pb and Ge as an anode material. It has been described that such an anode material may be used to prepare a safe non-aqueous secondary battery exhibiting a higher discharge operating voltage, an improved discharge capacity and excellent cycle properties.

JP-A 5-234583 has suggested that a carbon material coated with aluminum is used as an anode material for inhibiting rapid degradation of cycle properties caused when using an organic solvent with higher solvation force as an electrolyte. It can prevent intercalation between carbons while lithium ions are solvated, to prevent a carbon layer from being damaged and allow rapid degradation of cycle properties to be inhibited.

The prior art as described above has the following problems.

In the above technique described in JP-A 9-259868 that metal powder is contained in an anode or supported carbon material, metal particles cannot be evenly dispersed in the carbon material. Therefore, a metal is apt to be localized in an anode, so that repeating a charge-discharge cycle may cause localization of an electric field or peeling from a current collector. Difficulty of even distribution of metal particles would be due to difference in powder properties between the metal and the carbon material.

In a technique disclosed in JP-As 2000-90916 and 10-3920 that metal particles are coated with a carbonaceous material, uneven metal distribution is microscopically inevitable, leading to localization of an electric field. It is, therefore, difficult to maintain higher level of cycle properties.

These conventional techniques commonly have a problem that a high operating voltage cannot be obtained because when mixing a metal with a carbon material, a plateau peculiar to a metal is formed at a higher voltage than carbon in a discharge curve, leading to a lower operating voltage than that obtained when an anode is made of carbon alone. A lithium secondary battery has a predetermined lower limit voltage, depending on its application. Therefore, as an operating voltage is reduced, an available range becomes narrower. As a result, a capacity cannot be increased in a range where a battery is actually used.

The technique disclosed in Domestic re-publication of PCT international publication WO96/33519 also has the problem of an operating voltage. We have evaluated a battery using, as an anode, an amorphous metal-oxide represented by $SnB_xP_yO_x$ where x is 0.4 to 0.6 and y is 0.6 to 0.4 disclosed the above publication, and have found that it exhibits a lower operating voltage than that in a carbon anode and that a lower discharge current is required to achieve a sufficiently high capacity. Furthermore, the use of the anode material leads to increase in a weight, leaving room for improvement.

The technique disclosed in JP-A 5-234583 using aluminum as an anode material has a problem that as the cycle is repeated, a capacity is rapidly reduced, probably because electric field convergence to aluminum may cause, e.g., peeling in an electrode and aluminum reacts with water present in an electrolyte to form a thin insulating film on an aluminum surface.

The above conventional techniques cannot maintain a sufficiently high charge-discharge efficiency during long-term use, also leaving room for improvement.

SUMMARY OF THE INVENTION

In view of the above problems in the prior art, an objective of this invention is to substantially improve a battery efficiency in a range where the battery is actually used, while maintaining a higher charge-discharge efficiency and good cycle properties.

This invention provides an anode for a secondary battery capable of occluding and releasing lithium ions, the anode having a multi-layer structure comprising: a first layer containing carbon as a main component; and a second layer as a main component containing a lithium-occluding material film, the film capable of occluding lithium more than a theoretical lithium-occlusion capacity for carbon.

This invention also provides a secondary battery comprising the above anode; a cathode capable of occluding and releasing lithium ions; and an electrolyte between the cathode and the anode.

Carbon exhibits a relatively small theoretical lithium-occlusion capacity of 372 mAh/g, but has a good charge-discharge efficiency. It is, therefore, theoretically possible that carbon is combined with a material having a larger lithium-occlusion capacity to achieve both higher lithium-occlusion capacity and higher charge-discharge efficiency. However, a higher lithium-occlusion capacity and a higher charge-discharge efficiency cannot be simultaneously achieved by simply combining these materials, which has been described in "BACKGROUND OF THE INVENTION".

This invention employs a multi-layer structure comprising the first layer containing carbon as a main component and the second layer containing, as a main component, a lithium-occluding material capable of occluding lithium more than a theoretical lithium-occlusion capacity for carbon, for an anode. Both carbon material and lithium occluding material capable of occluding lithium more than a theoretical capacity of carbon are formed as a film so that their properties can be adequately demonstrated, resulting in achieving both higher lithium occlusion capacity and higher charge-discharge efficiency. Furthermore, since the material with a larger lithium occlusion capacity is evenly distributed in the anode, electric field distribution between the cathode and the anode is even. It can eliminate electric field localization and allow battery properties to be stable without damages such as peeling of an active material from a current collector even after a significant number of cycles. Although the first and the second layers comprise carbon and a lithium occluding material as a main component, respectively, they may optionally contain, for example, an additive.

According to this invention, an anode has a multi-layer structure comprising the first layer containing carbon as a main component and the second layer containing, as a main component, a lithium-occluding material film capable of occluding lithium more than a theoretical lithium-occlusion capacity for carbon, so that both higher lithium-occlusion capacity and higher charge-discharge efficiency can be achieved. Furthermore, since the active material with a larger lithium occlusion capacity is evenly distributed in the anode, electric field distribution between the cathode and the anode is even, resulting in prevention of electric field localization and good cycle properties.

In this invention, the second layer containing a lithium-occluding material film capable of occluding lithium more than a theoretical lithium-occlusion capacity for carbon may be amorphous to increase a battery capacity while maintaining a higher operating voltage and a higher charge-discharge efficiency because a discharge potential in an amorphous structure is lower than that in a crystal structure.

DETAILED DESCRIPTION OF PREFERRED EMBODIMENTS

Figure 16:
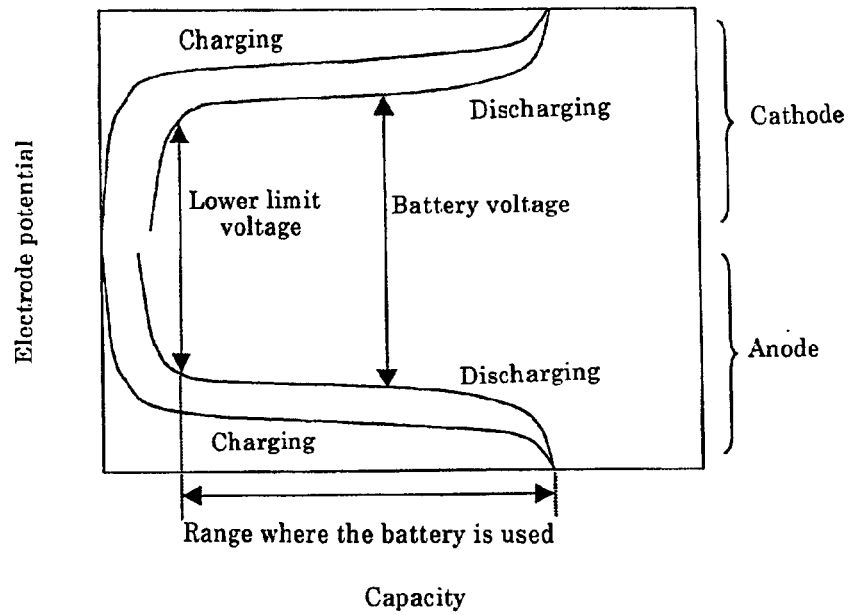
FIGS. 16A and 16B show a charge-discharge curve in a secondary battery according to the prior art, respectively.
Figure 16:
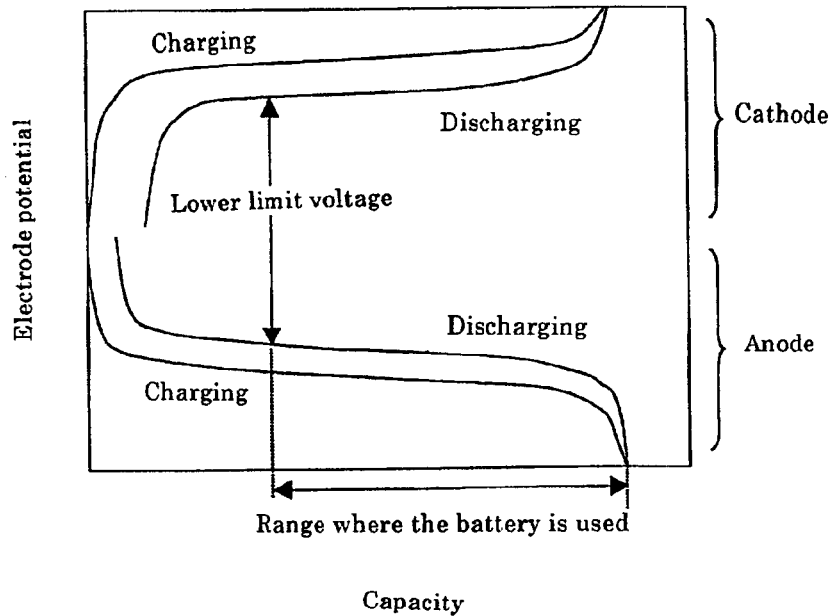

This invention will be described with reference to FIGS. 16 and 17.

Using a material with a larger lithium occlusion capacity as an anode material, a capacity itself may be increased. Simply using such a material cannot, however, increase a capacity in a range where a battery is actually used.

FIG. 16A shows a charge-discharge curve for a lithium secondary battery using lithium cobaltate as a cathode and carbon as an anode. In this figure, an electrode potential is determined with reference to lithium. A potential difference between the cathode and the anode is a battery voltage. A lower limit for the battery voltage is predetermined depending on its application, and it is important to attempt to increase a capacity in a range where a battery is used and equal to or above the lower limit. FIG. 16B shows a charge-discharge curve for a lithium secondary battery using lithium cobaltate as a cathode and polycrystalline silicon as an anode. Silicon has a larger lithium occlusion capacity than carbon, but exhibits a higher electrode potential during discharging as shown in the figure. A range equal to or higher than the lower limit is, therefore, narrow and thus a battery capacity is not improved in a range where a battery is actually used.

As described above, when attempting to improve a capacity in a range where a battery is used, by changing an anode structure, it is important to increase a lithium occlusion capacity of the anode to increase a capacity of battery as well as to control the increase in an anode potential during discharging to ensure a large range where a battery is used.

Figure 17:
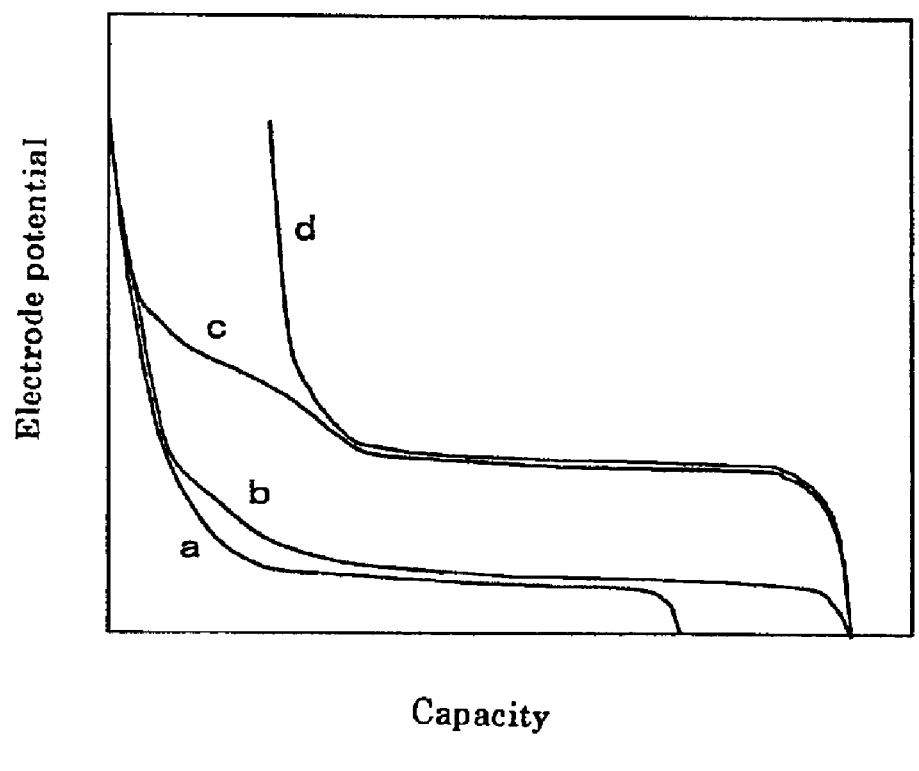
FIG. 17 shows charge-discharge curves in secondary batteries using an anode according to this invention and the prior art.

FIG. 17 shows a discharge curve when using a variety of anodes. In this figure, curves a, b, c and d are discharge curves for a carbon anode, an anode having a structure according to this invention where an amorphous Sn layer is deposited on a carbon layer, an anode comprising an activating material where the surfaces of crystalline Sn particles are coated with carbon, and an Sn anode, respectively. When an anode is made of a metal alone, an electrode potential is increased as in curve d. Thus, in comparison with carbon (curve a), a capacity itself is increased while a range where a battery is used becomes narrower. A capacity cannot be, therefore, increased in a range where a battery is used. When using an activating material where the surfaces of Sn particles are coated with carbon (curve c), lithium occluded in carbon and in the metal is sequentially released. A higher electrode potential is maintained in an initial stage of discharging. In this case (curve c), a range where a battery can be used also becomes narrower as in curve d. A capacity cannot be, therefore, adequately increased in a range where a battery is used.

On the other hand, when using an anode having a structure according to this invention where an amorphous Sn layer is deposited on a carbon layer (curve b), Sn is deposited as a layer with an amorphous structure so that a capacity can be increased without increase in an electrode potential, which is indicated by curve b. At the beginning of discharging, release of lithium from the amorphous Sn layer is initiated, and a potential of the amorphous Sn has a lower potential than crystal Sn so that discharging occurs at a lower electrode potential. Then, release of lithium from carbon is initiated and the transition gradually proceeds, giving a discharge curve without a distinct plateau. This anode can be, therefore, used to increase occluded lithium for increasing a capacity while controlling an electrode potential during discharging for ensuring a large range where a battery is used, to adequately improve a capacity in the range where a battery is used.

In this invention, both first and second layers may have either a single-layer structure or a laminated structure consisting of multiple layers. Although mutual positions between the first and the second layers are not particularly limited, either of these may be on the electrode-surface side. Specifically, any of the following structures may be employed.
  (a) the second layer is on an electrode surface side in relation to the first layer.
  (b) the first layer is on an electrode surface side in relation to the second layer.
  (c) the first layers are disposed above and below the second layer.
  (d) the second layers are disposed above and below the first layer.

In particular, the structure where the first layer is sandwiched between the second layers (structure (d)) or the second layer is sandwiched between the first layers (structure (c)) may be employed to further improve a battery capacity while maintaining a higher charge-discharge efficiency and good cycle properties.

In this invention, the second layer preferably has an amorphous structure. Since a discharge potential in an amorphous structure is lower than that in a crystal structure, a battery capacity can be increased while maintaining a higher operating voltage and a higher charge-discharge efficiency. As used herein, the term "amorphous" means that $2\theta$ in X-ray diffraction using CuKα ray exhibits a broad scattering band with a peak at 15 to 40°. The second layer is preferably formed by vapor deposition, CVD or sputtering. When formed by the deposition process, a layer formed is amorphous.

An amorphous structure, which is crystallographically isotropic, is more tolerant to an external stress and chemically more stable than a crystal structure. It is, therefore, less reactive to an electrolyte and is little influenced by expansion and shrinkage of an anode due to discharging and charging. It can thus exhibit good stability during repeating a charge-discharge cycle and may be tolerant to capacity degradation.

It is believed that an amorphous layer formed by vapor deposition, CVD or sputtering comprises micropores, through which lithium ions can easily move. Therefore, even when the second layer is disposed on the first layer, lithium ions can easily reach a lower carbon material layer, resulting in smooth discharging and charging.

Although a lithium occluding material constituting the second layer in this invention is not particularly limited as long as it can occlude more lithium than a theoretical lithium-occluding capacity for carbon, it is preferably a material comprising at least one element selected from the group consisting of Si, Ge, Sn and Pb, i.e., a material containing a group IVb element other than carbon. Such a material with an amorphous structure may be selected to increase a battery capacity while maintaining a higher operating voltage and a higher charge-discharge efficiency. In particular, a lithium-occluding material may be at least one selected from the group consisting of Si, Ge, Sn, Pb and oxides thereof to more significantly improve an operating voltage, a charge-discharge efficiency and a battery capacity, and to result in easier production. Among these, Si, Sn and their oxides are particularly preferable because variation in a structure during lithium occlusion is insignificant, repetitive charge-discharge does not cause degradation very much and good cycle properties can be obtained.

This invention may provide a structure comprising the third layer made of the oxide of a second-layer material on the second layer surface. For example, the second layer may be a silicon layer, on which is a silicon oxide layer is formed.

In this invention, the thicknesses of the first and the second layers may be appropriately determined depending on, e.g., an application. For example, the total thickness of the first layer may be 5 to 1000 μm while the total thickness of the second layer may be 0.1 to 500 μm. The total thickness of the second layer is preferably 0.0001 to 0.8 times the total thickness of the first layer. When forming the third layer, the total thickness of the second and the third layers is preferably 0.0001 to 0.85 times the total thickness of the first layer. Thus, a battery capacity can be increased while maintaining a higher charge-discharge efficiency.

This invention will be described with reference to embodiments and their examples.

Embodiment 1

Figure 1:
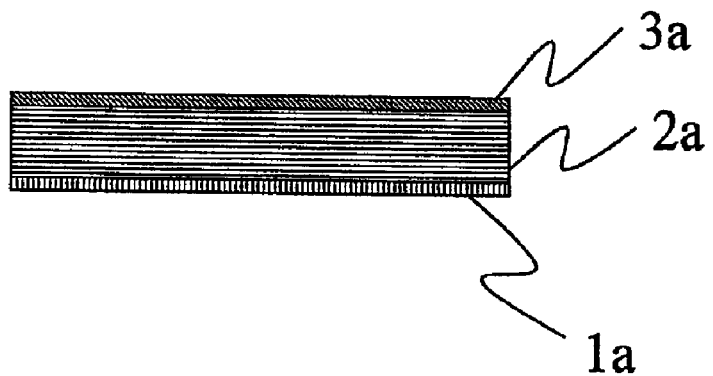
FIG. 1 shows an example of a cross-sectional structure in a secondary-battery anode according to this invention.

FIG. 1 shows a cross section of an anode in a non-aqueous electrolyte secondary battery according to this invention.

A current collector 1a is an electrode member for discharging current out of the battery and charging current into the battery from the outside during discharging and charging. The current collector 1a may be a foil made of a metal such as aluminum, copper, stainless, gold, tungsten and molybdenum. The current collector 1a may have a thickness of 5 to 25 μm.

A carbon anode 2a is an anode member occluding and releasing Li during discharging and charging. The carbon anode 2a is made of a carbon material capable of occluding Li; for example, graphite, fullerene, carbon nanotube, DLC, amorphous carbon, hard carbon and mixtures thereof. The carbon anode 2a may have a thickness of 30 to 300 μm. The carbon anode 2a may be formed by mixing the carbon material capable of occluding and releasing Li with a conductive material such as carbon black and vapor grown carbon fiber (VGCF), a binder such as polyvinylidene fluoride and a solvent such as N-methyl-2-pyrrolidone (NMP) to give a paste, which was then applied on the current collector 1a and dried.

For the following reason, preferably a material capable of more reducing resistance of the carbon anode 2a may be used as conductive material for giving conductivity to it. A lithium-occlusion capacity for an anode per its weight or volume is larger than that of carbon by itself because a material capable of occluding lithium more than a theoretical lithium-occlusion capacity for carbon is used as a lithium-occluding material film which constitute the second layer. As a result, charging and discharging rates viewed in a capacity of the whole anode are higher considering a carbon part itself so that conductivity of the carbon part contributes to the rate property of battery. Therefore, preferably a material capable of more reducing resistance of the carbon anode 2a especially VGCF may be used as the conductive material.

The second anode layer 3a is an anode member occluding and releasing Li during discharging and charging. The second anode layer 3a comprises a lithium occluding material capable of occluding more lithium than a theoretical lithium occlusion capacity for carbon; for example, silicon, tin, their alloys and their metal oxides, which can be used alone or in combination of two or more. The material is preferably amorphous. An amorphous material may be used to reduce an anode potential during discharging, resulting in increase in a battery operating voltage. The second anode layer 3a is preferably formed by CVD, vapor deposition or sputtering. These processes can form an amorphous layer with homogeneous film quality and an even film thickness. The second anode layer 3a may have a thickness of, for example, 0.1 μm to 240 μm. The second anode layer 3a may be doped with boron, phosphorous, arsenic or antimony to reduce a specific resistance.

Figure 2:
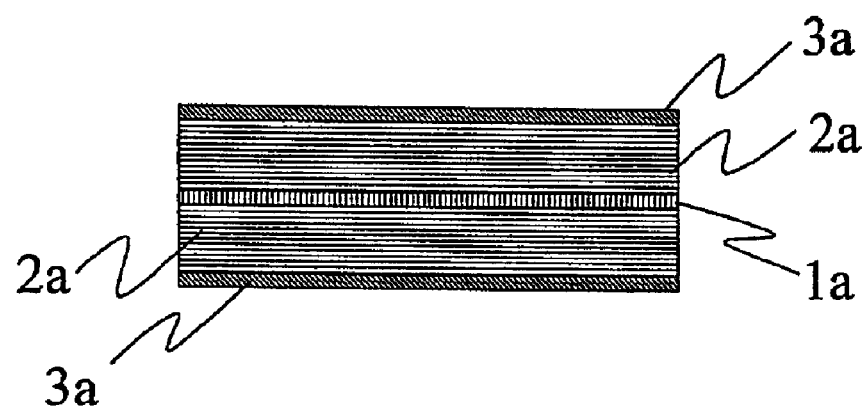
FIG. 2 shows another example of a cross-sectional structure in a secondary-battery anode according to this invention.

As a similar structure to the embodiment of this invention in FIG. 1, a battery may have a structure comprising the carbon anode 2a and the second anode layer 3a on both sides of the current collector 1a as shown in FIG. 2.

A cathode used in a lithium secondary battery according to this invention may be formed by dispersing and kneading a complex oxide $Li_xMO_2$ wherein M is at least one transition metal such as $Li_xCoO_2$, $Li_xNiO_2$, $Li_xMn_2O_4$, $Li_xMnO_3$ and $Li_xNi_yCo_{1-y}O_2$ in a solvent such as N-methyl-2-pyrrolidone (NMP) together with a conductive material such as carbon black and vapor grown carbon fiber (VGCF) and a binder such as polyvinylidene fluoride (PVDF) and then applying the mixture to a substrate.

A lithium secondary battery of this invention may be manufactured by laminating an anode according to this invention with the above cathode via a separator consisting of a porous film such as polyolefins (e.g., polypropylene and polyethylene) and fluororesins in an atmosphere of dry air or an inert gas or winding such a laminate, then placing the product in a battery case or sealing it with, for example, a flexible film which is a laminate of a synthetic resin and a metal foil.

An electrolyte may be prepared by using at least one aprotic organic solvent including cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylates such as methyl formate, methyl acetate and ethyl propionate; γ-lactones such as γ-butyrolactone; linear ethers such as 1,2-ethoxyethane (DEE) and ethoxymethoxyethane (EME); cyclic ethers such as tetrahydrofuran and 2-methyltetrahydrofuran; dimethylsulfoxide; 1,3-dioxolane; formamide; acetamide; dimethylformamide; dioxolane; acetonitrile; propionitrile; nitromethane; ethylmonoglyme; phosphotriesters; trimethoxyethane; dioxolane derivatives; sulfolane; methylsulfolane; 1,3-dimethyl-2-imidazolidinone; 3-methyl-2-oxazolidinone; propylene carbonate derivatives; tetrahydrofuran derivatives; ethyl ether; 1,3-propane sultone; anisole; and N-methylpyrrolidone and dissolving a soluble lithium salt in the organic solvent. Examples of such a lithium salt include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$ lower aliphatic carboxylic acid lithium salts, chloroborane lithium, lithium tetraphenylborate, LiBr, LiI LiSCN, LiCl and imides. A polymer electrolyte may be used in place of the above electrolyte.

Operation of the anode in the non-aqueous electrolyte secondary battery shown in FIGS. 1 and 2 will be detailed. The anode receives lithium ions from the cathode via an electrolyte during charging. Lithium ions are first bound to the second anode layer 3a on the anode surface to form a lithium compound. Since the second anode layer 3a is amorphous, the reaction gradually proceeds without exhibiting a distinct plateau. Then, the lithium ions are occluded in the carbon anode 2a and at the end of the occlusion, charging is completed. On the other hand, lithium ions occluded during charging are released from the carbon anode 2a during discharging. Then, lithium ions occluded in the second anode layer 3a are released. The release also proceeds as in charging without a distinct plateau. The lithium ions released from the anode are transferred to the cathode via an electrolyte.

EXAMPLE 1

This invention will be more specifically described with reference to an example of embodiment 1.

In this example, a current collector 1a was a copper foil and a carbon anode 2a was a graphite layer with a thickness of 100 μm after compression. The second anode layer 3a was an Si layer with a thickness of 1 μm, which was formed by a variety of deposition processes such as vapor deposition, CVD and sputtering.

The anode of the non-aqueous electrolyte secondary battery illustrated in FIG. 1 was prepared as follows. A copper foil with the thickness of 10 μm was used as a current collector 2a, on which a carbon anode 2a was deposited. The carbon anode 2a was formed by mixing graphite powder with polyvinylidene fluoride as a binder dissolved in N-methyl-2-pyrrolidone and a conductivity generator to give a paste, which was then applied on the current collector 1a and dried. After drying, the carbon anode 2a was compressed by a press. On the carbon anode 2a was deposited the second anode layer 3a made of Si metal by a deposition process such as vapor deposition, CVD and sputtering to give three kinds of anodes.

A secondary battery anode with a structure illustrated in FIG. 2 was also prepared as described above. There were no problems in the preparation.

Figure 3:
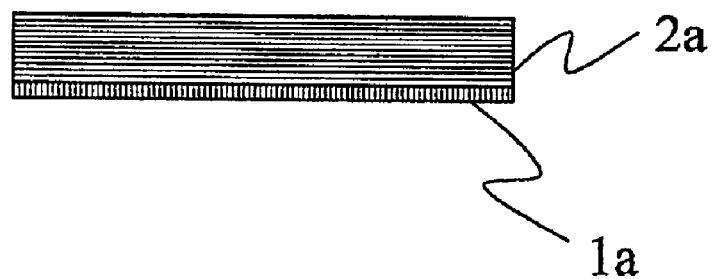
FIG. 3 shows an example of a cross-sectional structure in a secondary-battery anode according to a comparative example.

As Comparative Example 1, an anode was prepared, which comprised a current collector 1a of a copper foil with the thickness of 3 μm and a carbon anode 2a made of graphite with the thickness of 100 μm after compression as shown in FIG. 3.

Figure 4:
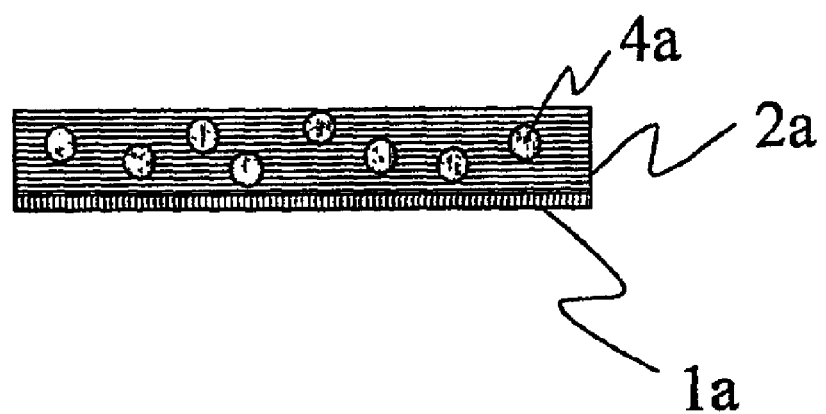
FIG. 4 shows another example of a cross-sectional structure in a secondary-battery anode according to a comparative example.

As Comparative Example 2, an anode was prepared, which comprised a current collector 1a of a copper foil with the thickness of 10 μm and a carbon anode 2a containing aluminum powder 4a with a particle size of 20 to 100 μm as shown in FIG. 4.

The other elements, i.e., an electrolyte and a cathode, were made of the same material as described above.

The anode in the above example (the structure in FIG. 1) and the anodes in Comparative Examples 1 and 2 were evaluated for their charge-discharge capacity and cycle properties as a battery. A current density in charging and discharging was 10 mA/cm². The results for these examples and comparative examples are shown in Table 1. The results indicate that an initial charge-discharge capacity is stable irrespective of a deposition process for an Si film. In the battery of this example, a capacity density was increased to 1.4 times that in Comparative Example 1 (carbon anode). A charge-discharge efficiency (discharge capacity/charge capacity) was unchanged; that is, it was more than 93%, as compared to the carbon anode in Comparative Example 1. The results also indicate that the anode in Comparative Example 2 has a charge capacity comparable to that in this example while having a discharge capacity lower than that in this example. A charge-discharge efficiency in Comparative Example 2 is as low as about 82%, indicating occurrence of capacity loss.

TABLE 1

|  | Ex. 1 Vapor deposition | Ex. 1 CVD | Ex. 1 Sputtering | Comp. Ex. 1 | Comp. Ex. 2 |
| --- | --- | --- | --- | --- | --- |
| Initial charge capacity (mAh/g) | 476 | 472 | 473 | 340 | 468 |
| Initial discharge capacity (mAh/g) | 446 | 441 | 443 | 318 | 383 |
| Charge-discharge efficiency (%) | 93.7 | 93.4 | 93.7 | 93.5 | 81.8 |

Figure 5:
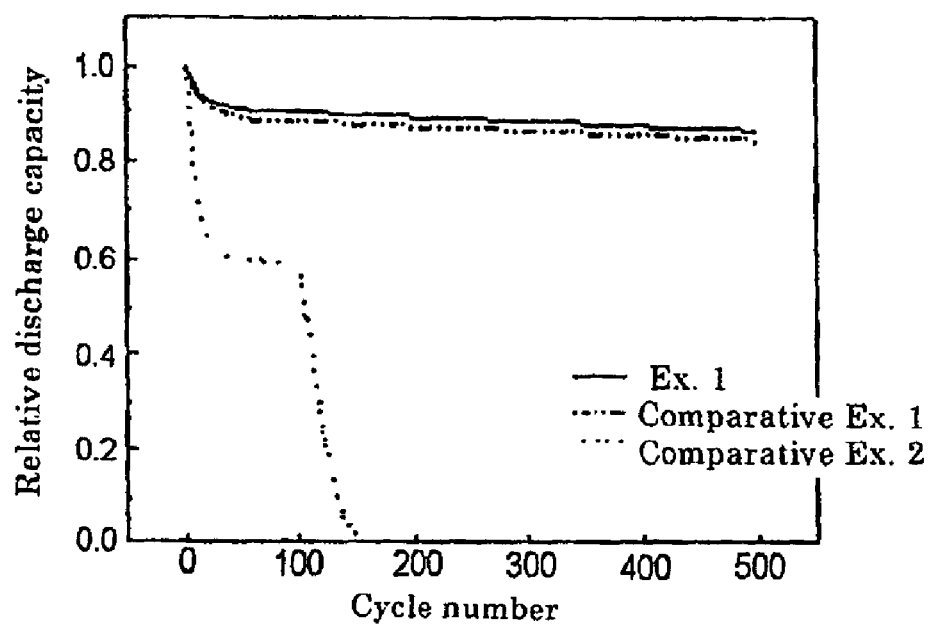
FIG. 5 shows charge-discharge cycle properties in Example 1 and Comparative Examples 1 and 2.

Next, this example and Comparative Examples 1 and 2 were evaluated for charge-discharge cycle properties. A current density during charging and discharging was 10 mA/cm². The results are shown in FIG. 5. Although this example used the anode deposited by vapor deposition, comparable charge-discharge cycle properties were obtained for an anode of an Si film formed by CVD or sputtering. In the figure, an ordinate represents a capacity in which an initial charge-discharge capacity is assumed to be 1 for convenience, while an abscissa represents a cycle number. In this example of this invention, 85% or more of the initial charge capacity is retained after 500 cycles, which is comparable to Comparative Example 1. Since an initial charge capacity in this example is 1.4 times that in Comparative Example 1, it can be concluded that the sample of this example has a higher capacity if cycle properties are equivalent. In contrast, a charge capacity in Comparative Example 2 is decreased as a cycle number increases, and a capacity is rapidly reduced when a cycle number is over 150 (rapid fade) because, for example, electrode peeling occurs due to electric field localization to aluminum powder. Such a phenomenon occurs for aluminum probably because activity in aluminum may become higher by lithium occlusion so that high-activity and stable states are repeated due to charging and discharging, leading to gradual degradation of an aluminum structure.

From the evaluation results for cycle properties in this example, it is evident that a secondary battery comprising an anode according to this invention has an improved charge-discharge capacity and stable cycle properties.

EXAMPLE 2

This invention will be more specifically described with reference to Example 2 of embodiment 1.

In this example, a current collector 1a was a copper foil with a thickness of 10 μm; a carbon anode 2a was a graphite layer with a thickness of 90 μm after compression comprising VGCF as a conductive material; the second anode layer 3a was an Sn film with a thickness of 2 μm. Furthermore, the second anode layer 3a was formed using $SiO_x$ (0<x≦2), $SnO_x$ (0<x≦2) or a mixture of Si and Sn (Si/Sn) to 2 μm. Vapor deposition was used for forming Sn, $SiO_x$, SnO and Si/Sn films.

Figure 18:
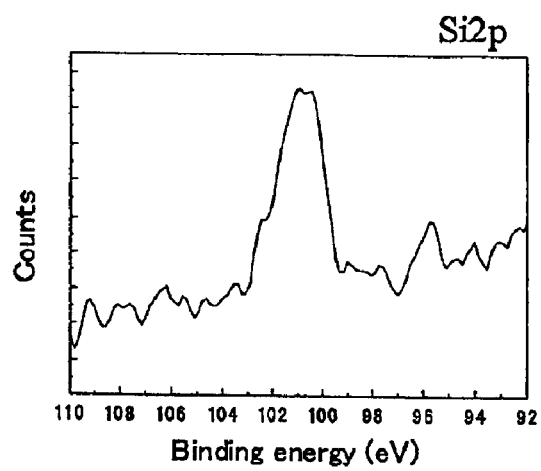
FIG. 18 shows the results of XPS for an anode according to this invention.

For example, for a sample prepared using a Si oxide film as the second anode layer 3a, its surface was analyzed by XPS (X-ray Photoelectron Spectrometry). The results are shown in FIG. 18. FIG. 18 shows Si2p, where a peak is observed in 100 to 102 eV. For $SiO_z$ in which a stoichiometric ratio is an integer, a peak should be observed at about 103 eV, the peak observed, however, indicates a small shift. These results demonstrate that in this oxide film, a stoichiometric ratio is disturbed and partially a composition of $SiO_x$ (0<x≦2) exists.

As Comparative Example 3, an Al film deposited by vapor deposition was used as the second anode layer 3a. A current density in charging and discharging was 10 mA/cm². For anodes thus prepared, an initial charge-discharge capacity and reduction in a charge capacity after 500 cycles in comparison with an initial charge capacity were determined.

Measurement was conducted under the same conditions in Example 1. The results are shown in Table 2. The results indicate that when using any of Sn, $SiO_x$, $SnO_x$ and Si/Sn films as the second anode layer 3a, a capacity was 1.3 folds or more of that in Comparative Example 1 in Example 1 and a capacity after 500 cycles was retained to be 85% or more of the initial capacity. However, although an initial capacity was high in Comparative Example 3, rapid fade occurred during cycle repetition and the battery became unusable after 135 cycles.

TABLE 2

| | Ex. 2 (Sn) | Ex. 2 (SiO) | Ex. 2 (SnO) | Ex. 2 (Si/Sn) | Comp. Ex. 2 |
|---|---|---|---|---|---|
| Initial charge capacity (mAh/g) | 461 | 475 | 458 | 468 | 449 |
| Initial discharge capacity (mAh/g) | 432 | 444 | 428 | 438 | 370 |
| Charge-discharge efficiency | 93.7% | 93.5% | 93.4% | 93.6% | 82.4% |
| Retained capacity after 500 cycles | 85.4% | 85.5% | 85.2% | 85.5% | Failure after 135 cycles |

EXAMPLE 3

This invention will be more specifically described with reference to Example 3 of embodiment 1.

Figure 6:
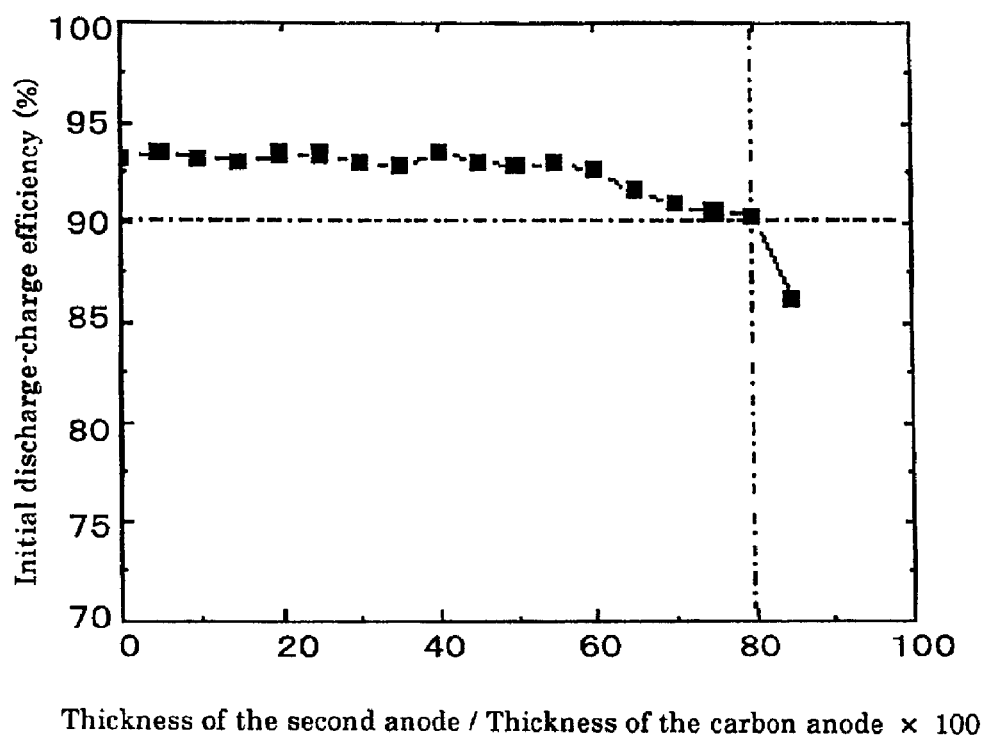
FIG. 6 shows effects of a thickness of the second anode layer on an initial charge-discharge efficiency in a battery using the secondary battery anode in FIG. 1.

In this example, a current collector 1a was a copper foil with a thickness of 10 μm; a carbon anode 2a was a graphite layer with a thickness of 100 μm after compression; and the second anode layer 3a was an one of Si films with different thicknesses in the range of 0 to 95 μm by 5 μm to prepare a non-aqueous electrolyte secondary battery. The anodes thus obtained were evaluated for their initial charge-discharge efficiency. A current density in charging and discharging was 10 mA/cm². The results are shown in FIG. 6. In FIG. 6, an abscissa represents a value obtained by multiplying a thickness of the second anode layer (the second layer) / a thickness of the carbon anode (the first layer) by 100. The results indicate that when a thickness of the second anode layer 3a is 80% or less of a thickness of the carbon anode, an initial charge-discharge efficiency is 90% or more. Similar results were obtained when using Sn, $SiO_x$, $SnO_x$ or Si/Sn as the second anode layer 3a. Furthermore, it is also revealed that a thickness of the second anode layer 3a equal to 80% or less of a thickness of the carbon anode 2a may give a initial charge-discharge efficiency of 90% or more, when the thickness of the carbon anode 2a is within the range of 10 to 500 μm.

Furthermore, it was found that an oxide contained in the second anode layer 3a was effective for reduction of a water content and a hydrofluoric acid level in an electrolyte. An electrolyte is generally contaminated with a small amount of water during preparation of the electrolyte or assembling a battery, or from a sealed part in the battery over time. The moisture reacts with a lithium salt present in the electrolyte to generate hydrofluoric acid. For example, when an electrolyte contains $LiPF_6$, it reacts with water as follows to give hydrofluoric acid.

$$LiPF_6 + H_2O \rightarrow HF + PF_5 + LiOH \quad (1)$$

If the content of hydrofluoric acid is excessive, positive ions in a cathode may be eluted or LiF is formed on the anode surface excessively to cause increase in a resistance within the battery. It was found that an oxide present in the second anode layer 3a could react with and consume hydrofluoric acid. For example, when an oxide film is $SiO_2$, the following reaction occurs to reduce the water content to ⅓.

$$SiO_2 + HF \; \tfrac{1}{6}H_2SiF_6 + \tfrac{1}{3}H_2O \quad (2)$$

As the reaction is repeated, the water content in the battery is reduced finally to less than a detection limit. In addition, since water is not present in this system, the reaction shown in (1) does not occur and of course a level of hydrofluoric acid is less than a detection limit.

A battery was prepared using an electrode comprising $SiO_x$ or $SnO_x$ as described in Example 2 and, as an electrolyte, a 7/3(EC/DEC) mixture of EC and EDC containing 1M $LiPF_6$ as a lithium salt. For the battery thus prepared, 10 cycles of charging and discharging were conducted and the electrolyte was extracted from the battery case for assaying the water content and the content of hydrofluoric acid. The water content and the content of hydrofluoric acid were assayed by Karl Fischer method and potentiometric titration, respectively.

The results are shown in Table 3. For comparison, 10 cycle charge-discharge was conducted for the battery in Comparative Example 1, and the electrolyte was extracted. The water and the hydrofluoric-acid contents of the extract and of the electrolyte before the injection are shown. The results indicate that moisture and hydrofluoric acid are reduced in the electrolyte by $SiO_x$ or $SnO_x$ in Example 2 because hydrofluoric acid generated by reaction of the lithium salt with water in the electrolyte was consumed by reacting with the oxide film in the second anode layer 3a.

TABLE 3

| | Ex. 2 ($SiO_x$) | Ex. 2 ($SnO_x$) | Comp. Ex. 1 | Before injection |
|---|---|---|---|---|
| Moisture content | 10 ppm or less | 10 ppm or less | 16 ppm | 12 ppm |
| Hydrofluoric acid content | 10 ppm or less | 10 ppm or less | 48 ppm | 25 ppm |

Embodiment 2

Figure 7:
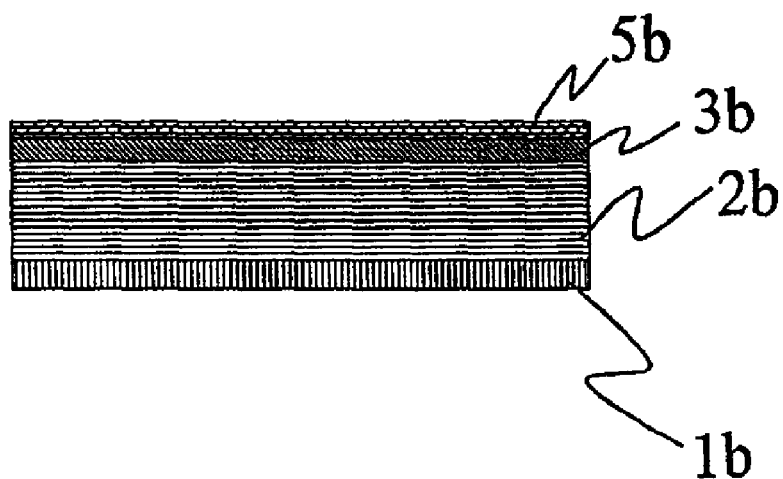
FIG. 7 shows another example of a cross-sectional structure in a secondary-battery anode according to this invention.

The second embodiment of this invention will be detailed with reference to the drawings. FIG. 7 is a cross section of an anode in a non-aqueous electrolyte secondary battery according to this embodiment.

A current collector 1b is an electrode member for discharging current out of the battery and charging current into the battery from the outside during discharging and charging. The current collector 1b may be a foil made of a metal such as aluminum, copper, stainless, gold, tungsten and molybdenum. The current collector 1b may have a thickness of 5 to 25 μm.

A carbon anode 2b is an anode member occluding and releasing Li during discharging and charging. The carbon anode 2b is made of a carbon material capable of occluding Li; for example, graphite, fullerene, carbon nanotube, DLC, amorphous carbon, hard carbon and mixtures thereof. The carbon anode 2b may have a thickness of 30 to 300 μm.

The second anode layer 3b comprises a lithium occluding material capable of occluding more lithium than a theoretical lithium occlusion capacity for carbon; for example, silicon, tin, their alloys and their metal oxides, which can be used alone or in combination of two or more. The material is preferably amorphous. An amorphous material may be used to reduce an anode potential during discharging, resulting in increase in a battery operating voltage. The second anode layer 3b is preferably formed by CVD, vapor deposition or sputtering. These processes can form an amorphous layer with homogeneous film quality and an even film thickness. The second anode layer 3b may have a thickness of, for example, 0.1 μm to 20 μm. The second anode layer 3b may be doped with boron, phosphorous, arsenic or antimony to reduce a specific resistance.

The oxide film 5b is an oxide of silicon, tin or an alloy thereof for the second anode layer, which is an amorphous oxide film formed by vapor deposition, CVD, sputtering, thermal oxidation or natural oxidation. The oxide film 5b may have a thickness of 1 nm to 100 nm.

Figure 8:
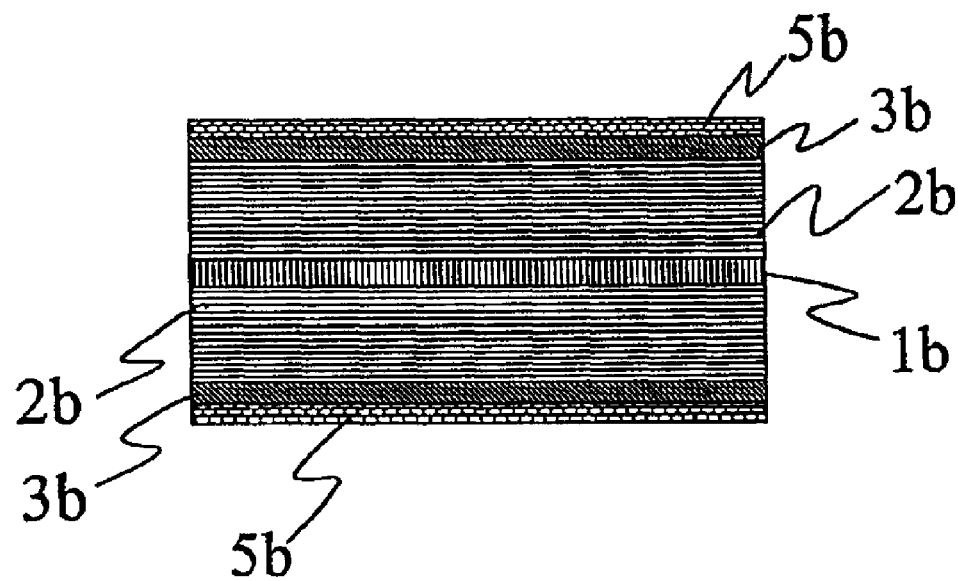
FIG. 8 shows another example of a cross-sectional structure in a secondary-battery anode according to this invention.

As a similar structure to the embodiment of this invention in FIG. 7, a battery may have a structure comprising the carbon anode 2b, the second anode layer 3b and the oxide film 5b on both sides of the current collector 1b as shown in FIG. 8.

Operation of the anode in the non-aqueous electrolyte secondary battery shown in FIGS. 7 and 8 will be detailed. The anode receives lithium ions from the cathode via an electrolyte during charging. Lithium ions, are first bound to the oxide film 5b and the second anode layer 3b on the anode surface to form a lithium compound. Since the oxide film 5b and the second anode layer 3b are amorphous, the reaction gradually proceeds without exhibiting a distinct plateau. Then, the lithium ions are occluded in the carbon anode 2b and at the end of the occlusion, charging is completed. On the other hand, lithium ions occluded during charging are released from the carbon anode 2b during discharging. Then, lithium ions occluded in the oxide film 5b and the second anode layer 3b are released. The release also proceeds as in charging without a distinct plateau. The lithium ions released from the anode are transferred to the cathode via an electrolyte.

EXAMPLE 4

This invention will be more specifically described with reference to Example 4 of embodiment 2.

In this example, a current collector 1b was a copper foil with a thickness of 15 μm; a carbon anode 2b was a graphite layer with a thickness of 90 μm after compression; the second anode layer 3b was an Si film with a thickness of 1 μm; and the oxide film 5b was $SiO_x$ ($0<x\leq2$), $SnO_x$ ($0<x\leq2$) with a thickness of 1.6 nm. The anode thus prepared was evaluated for its discharge-charge capacity and cycle properties as a battery. A current density in charging and discharging was 10 $mA/cm^2$. The results are shown in Table 4. The results indicate that when using any of $SiO_x$ and $SnO_x$ ($0<x\leq2$) films as the oxide film 5b, a initial capacity was 1.3 folds or more of that in Comparative Example 1 in Example 1 and a capacity after 500 cycles was retained to be 85% or more of the initial capacity.

TABLE 4

|  | Ex. 4 Oxide film: $SiO_x$ | Ex. 4 Oxide film: $SnO_x$ | Comp. Ex. 1 |
|---|---|---|---|
| Initial charge capacity (mAh/g) | 478 | 476 | 340 |
| Initial discharge capacity (mAh/g) | 445 | 443 | 317 |
| Charge-discharge efficiency | 93.1% | 93.1% | 93.2% |
| Retained capacity after 500 cycles | 85.9% | 85.5% | 85.3% |

EXAMPLE 5

This invention will be more specifically described with reference to Example 5 of embodiment 2.

Figure 9:
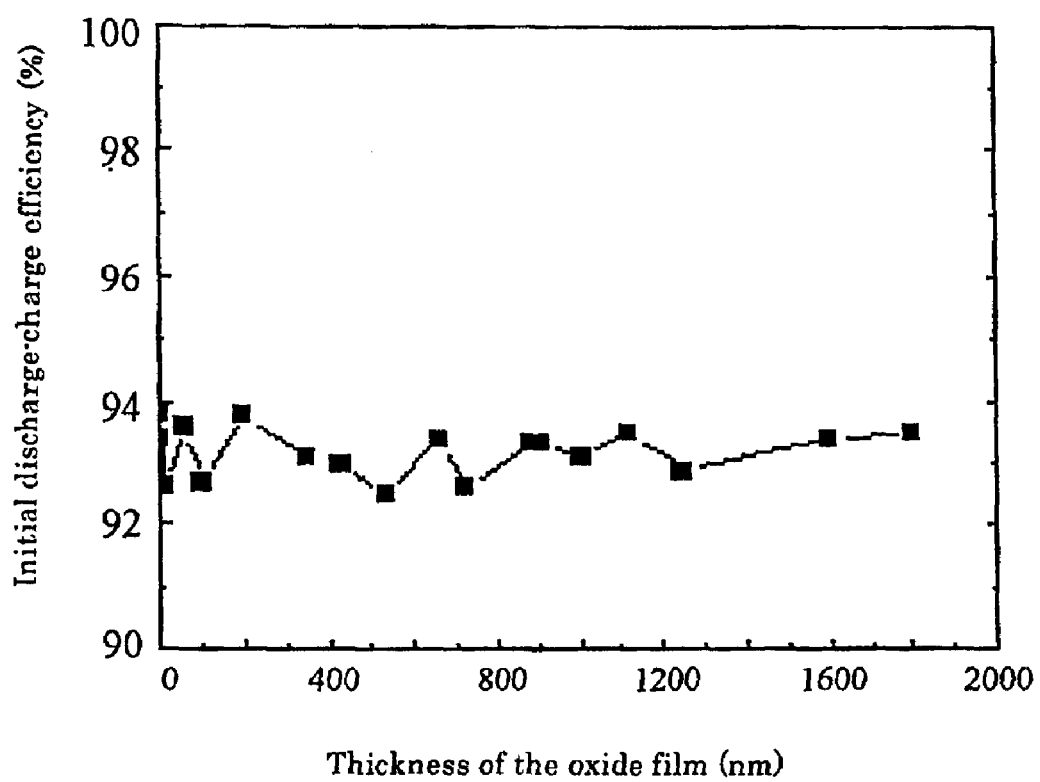
FIG. 9 shows effects of a thickness of an oxide film on an initial charge-discharge efficiency in a secondary battery according to the second embodiment of this invention (Example 5).

In this example, a current collector 1b was a copper foil with a thickness of 15 μm; a carbon anode 2b was a graphite layer with a thickness of 90 μm after compression; and the second anode layer 3b was an Si film with a thickness of 2 μm. Oxide films 5b were formed using $SiO_x$ ($0<x\leq2$) varying a thickness. The results are shown in FIG. 9. In FIG. 9, an abscissa and an ordinate represent a thickness of oxide film 5b and an initial charge-discharge efficiency, respectively. As seen in this figure, under any thickness condition, a charge-discharge efficiency was as good as within 93%±1%, regardless of a thickness of the oxide film 5b. In any case, a charge-discharge efficiency was 99% or more in 2nd or later cycle.

Figure 19:
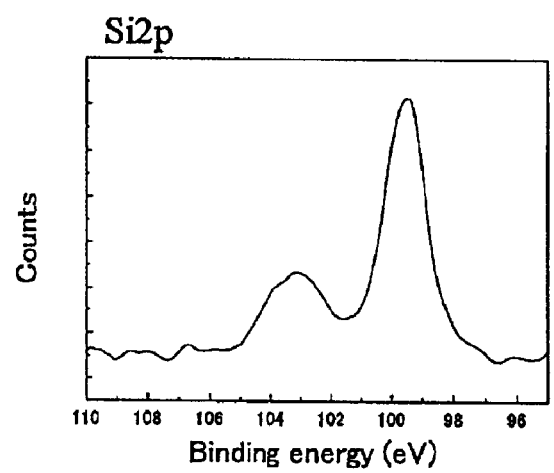
FIG. 19 shows the results of XPS for an anode according to this invention.

FIG. 19 shows the results of XPS (X-ray Photoelectron Spectrometry) for an anode according to this embodiment before charging and discharging. FIG. 19 shows Si2p, where peaks are observed in 99 to 100 eV derived from Si and in 102 to 104 eV derived from $SiO_2$. A thickness was 2 μm for the Si film and 1.5 nm for the $SiO_2$.

EXAMPLE 6

This invention will be more specifically described with reference to Example 6 of embodiment 2.

Figure 10:
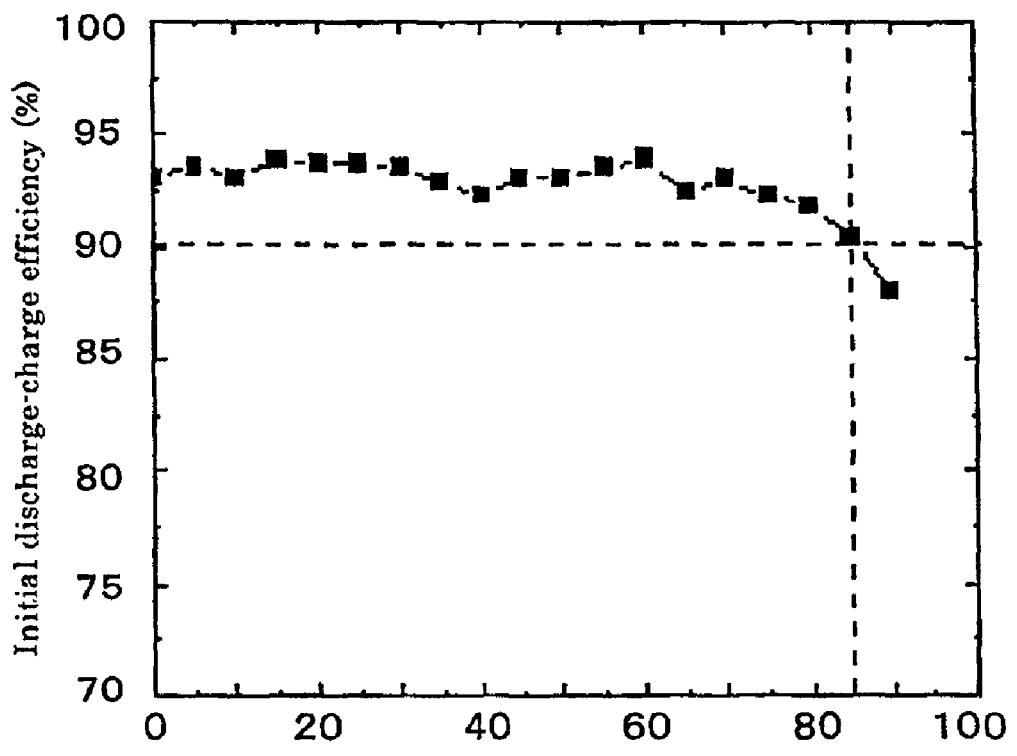
FIG. 10 shows effects of a thickness of the second anode layer on an initial charge-discharge efficiency in a secondary battery using the secondary battery anode in FIG. 7.

In this example, a current collector 1b was a copper foil with a thickness of 15 μm; a carbon anode 2b was a graphite layer with a thickness of 100 μm after compression; the second anode layer 3b was an Sn film; and an oxide film 5b is made of $SnO_x$ ($0<x\leq2$). Varying the total thickness of the second anode layer 3b and the oxide film 5b to the thickness of the carbon anode 2b after compression, variation in charge-discharge properties was evaluated. The results are shown in FIG. 10. In FIG. 10, an abscissa represents a value obtained by multiplying the total thickness of the second anode layer 3b and the oxide film 5b/the thickness of the carbon anode 2b by 100, while an ordinate represents an initial charge-discharge efficiency. The results indicate that when a value obtained by multiplying the total thickness of the second anode layer 3b and the oxide film 5b/the thickness of the carbon anode 2b by 100 is 85 or less, an initial charge-discharge efficiency is as good as 90% or more.

It was found that the oxide 5b on the second anode layer 3b was effective for reducing a hydrofluoric acid level in the electrolyte as in embodiment 1. An electrolyte was a 7/3 (EC/DEC) mixture of EC and DEC containing 1M $LiPF_6$ as a lithium salt. It was observed in Examples 4 to 6 that either of the contents of moisture and hydrofluoric acid was 10 ppm or less, which was lower than those in the electrolyte before use (Table 3). It is because hydrofluoric acid generated by a reaction of the lithium salt with moisture in the electrolyte was consumed by reacting with: the oxide film 5b on the second anode layer 3b.

Embodiment 3

Figure 11:
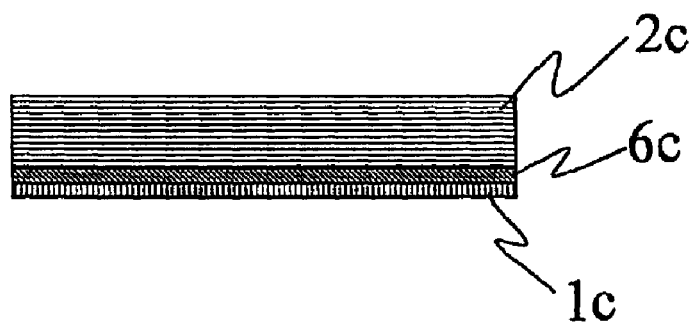
FIG. 11 shows another example of a cross-sectional structure in a secondary-battery anode according to this invention.

The third embodiment of this invention will be detailed with reference to the drawings. FIG. 11 is a cross section of an anode in a non-aqueous electrode secondary battery according to this embodiment.

A current collector 1c is an electrode member for discharging current out of the battery and charging current into the battery from the outside during discharging and charging. The current collector 1c may be a foil made of a metal such as aluminum, copper, stainless, gold, tungsten and molybdenum. The current collector 1c may have a thickness of 5 to 25 μm.

A carbon anode 2c is an anode member occluding and releasing Li during discharging and charging, which is made of, for example, graphite, fullerene, carbon nanotube, DLC, amorphous carbon, hard carbon and mixtures thereof.

A lower anode 6c comprises a lithium occluding material capable of occluding more lithium than a theoretical lithium occlusion capacity for carbon; for example, silicon, tin, their alloys and their metal oxides, which can be used alone or in combination of two or more. The material is preferably amorphous. An amorphous material may be used to reduce an anode potential during discharging, resulting in increase in a battery operating voltage. The second anode layer 3b is preferably formed by CVD, vapor deposition or sputtering. These processes can form an amorphous layer with homogeneous film quality and an even film thickness. The second anode layer 3b may have a thickness of, for example, 0.1 μm to 20 μm. The second anode layer 3b may be doped with boron, phosphorous, arsenic or antimony to reduce a specific resistance.

Figure 12:
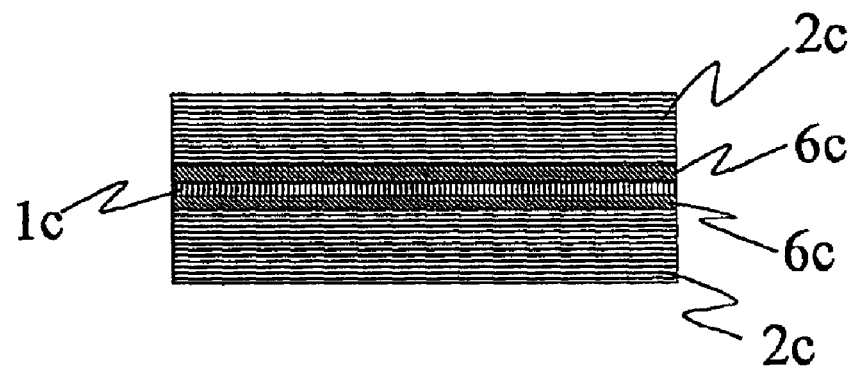
FIG. 12 shows another example of a cross-sectional structure in a secondary-battery anode according to this invention.

As a similar structure to the third embodiment of this invention in FIG. 11, a battery may have a structure comprising the lower anode 6c and the carbon anode 2c on both sides of the current collector 1b as shown in FIG. 12.

Operation of the anode in the non-aqueous electrolyte secondary battery shown in FIGS. 11 and 12 will be detailed. The anode receives lithium ions from cathode via an electrolyte during charging. Lithium ions are first dispersed in the carbon anode 2c and then bound to the lower anode 6c to form a lithium compound. Since the lower anode 6c is amorphous, a voltage during charging and discharging gradually varies without exhibiting a distinct plateau. Then, the lithium ions are occluded in the carbon anode 2c and at the end of the occlusion, charging is completed. On the other hand, lithium ions occluded during charging are released from the carbon anode 2c during discharging. Then, lithium ions occluded in the lower anode 6c are released. The release also proceeds as in charging without a distinct plateau. The lithium ions released from the anode are transferred to the cathode via an electrolyte.

EXAMPLE 7

This invention will be more specifically described with reference to Example 7 of embodiment 3.

In this example, a current collector 1c was a copper foil with a thickness of 15 μm; the lower electrode 6c is a layer consisting of an Si film formed by vapor deposition, its oxide film ($SiO_x$, $0<x\leq 2$) or a multi-layer film consisting of Si and its oxide films with a thickness of 2 μm; and the carbon anode 2c is made of graphite with a thickness of 105 μm. The anode thus prepared was evaluated for its charge-discharge capacity and cycle properties as a battery. The results are shown in Table 5. The results indicate that when using any of Si, $SiO_x$ and a multi-layer of Si and its oxide films, a capacity was 1.3 times or more that in Comparative Example 1 in Example 1 and a capacity after 500 cycles was retained to be 85% or more of the initial capacity.

TABLE 5

|  | Ex. 7 (Si) | Ex. 7 ($SiO_x$) | Ex. 7 (Si/$SiO_x$) | Comp. Ex. 1 |
|---|---|---|---|---|
| Initial charge capacity (mAh/g) | 482 | 480 | 479 | 340 |
| Initial discharge capacity (mAh/g) | 450 | 448 | 448 | 317 |
| Charge-discharge efficiency | 93.4% | 93.3% | 93.5% | 93.2% |
| Retained capacity after 500 cycles | 85.9% | 85.5% | 85.6% | 85.3% |

EXAMPLE 8

This invention will be more specifically described with reference to Example 8 of embodiment 3.

Figure 13:
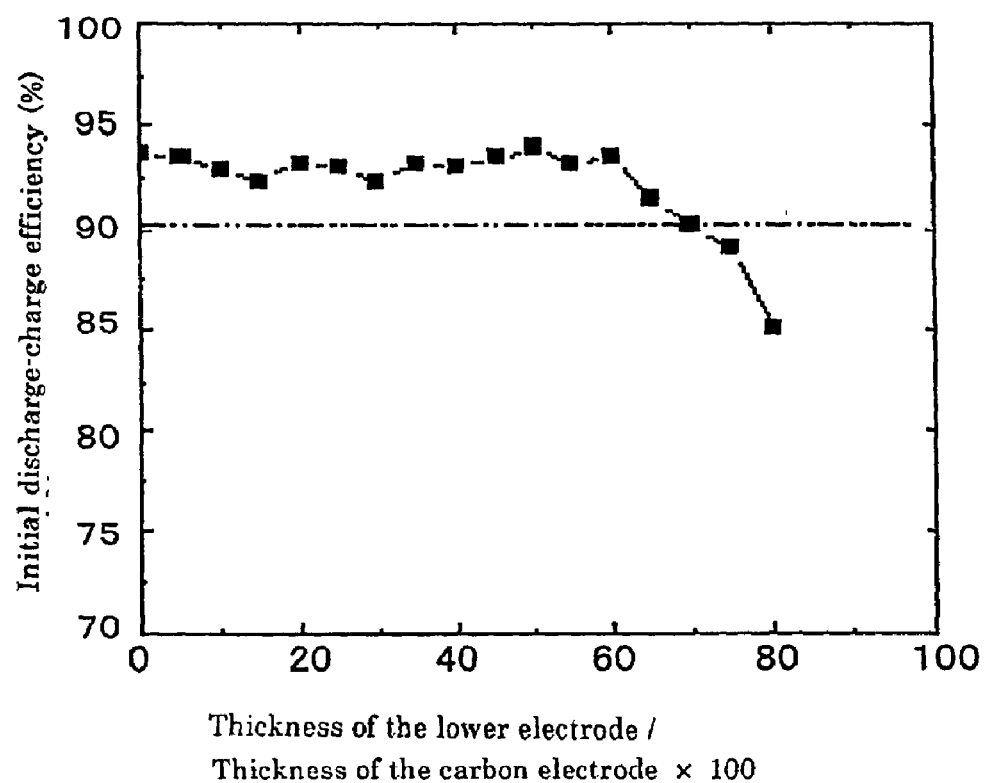
FIG. 13 shows effects of a thickness of a lower electrode film on an initial charge-discharge efficiency in a secondary battery using the secondary battery anode in FIG. 11.

In this example, a current collector 1c was a copper foil with a thickness of 12 μm; the lower electrode 6c was Si formed by CVD; and the carbon anode 2c was a graphite layer with a thickness of 105 μm. varying the thickness of the lower anode 6c to the thickness of the carbon anode 2c after compression, variation in charge-discharge properties was evaluated. The results are shown in FIG. 13. In FIG. 13, an abscissa represents a value obtained by multiplying the thickness of the lower electrode 6c/the thickness of the carbon anode 2c by 100, while an ordinate represents an initial charge-discharge efficiency. The results indicate that when a value obtained by multiplying the thickness of the lower electrode 6c/the thickness of the carbon anode 2c by 100 is 70 or less, an initial charge-discharge efficiency is as good as 90% or more.

It was found that the oxide in the lower electrode 6c was effective for reducing a hydrofluoric acid level in the electrolyte as in embodiment 1. An electrolyte was a 7/3(EC/DEC) mixture of EC and DEC containing 1M $LiPF_6$ as a lithium salt. It was observed that when using $SiO_x$ or an Si/$SiO_x$ multi-layer film, either of the contents of moisture and hydrofluoric acid was 10 ppm or less, which was lower than those in the electrolyte before use (Table 3). It is because hydrofluoric acid generated by a reaction of the lithium salt with moisture in the electrolyte was consumed by reacting with the oxide in the lower electrode 6c.

Embodiment 4

Figure 14:
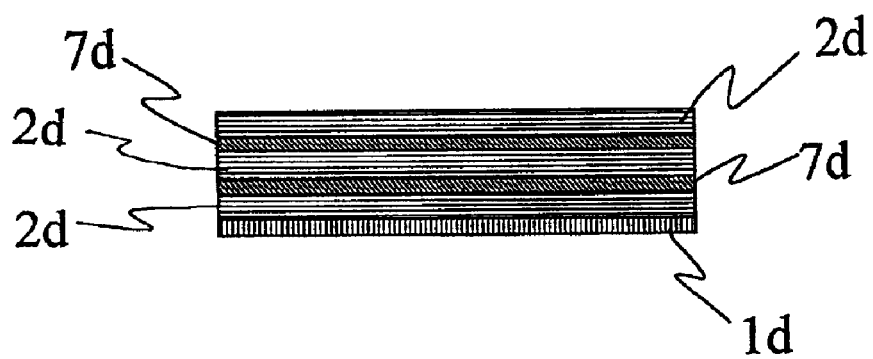
FIG. 14 shows another example of a cross-sectional structure in a secondary-battery anode according to this invention.

The fourth embodiment of this invention will be detailed with reference to the drawings. FIG. 14 is a cross section of an anode in a non-aqueous electrode secondary battery according to this embodiment.

A current collector 1d is an electrode member for discharging current out of the battery and charging current into the battery from the outside during discharging and charging. The current collector 1d may be a foil made of a metal such as aluminum, copper, stainless, gold, tungsten and molybdenum. The current collector 1d may have a thickness of 5 to 25 μm.

A carbon anode 2d is an anode member occluding and releasing Li during discharging and charging, which is made of, for example, graphite, fullerene, carbon nanotube, DLC, amorphous carbon, hard carbon and mixtures thereof.

An intermediate anode layer 7d comprises a lithium occluding material capable of occluding more lithium than a theoretical lithium occlusion capacity for carbon; for example, silicon, tin, their alloys and their metal oxides, which can be used alone or in combination of two or more. The material is preferably amorphous. An amorphous material may be used to reduce an anode potential during discharging, resulting in increase in a battery operating voltage. The intermediate anode layer 7d is preferably formed by CVD, vapor deposition or sputtering. These processes can form an amorphous layer with homogeneous film quality and an even film thickness. The intermediate anode layer 7d may have a thickness of, for example, 0.1 μm to 20 μm. The intermediate anode layer 7d may be doped with boron, phosphorous, arsenic or antimony to reduce a specific resistance. The carbon anode 2d may comprise one or more intermediate layers 7d. Alternatively, the intermediate anode layer may be formed on the surface of the current collector 1d or the carbon anode 2d rather than in the carbon anode 2d.

Figure 15:
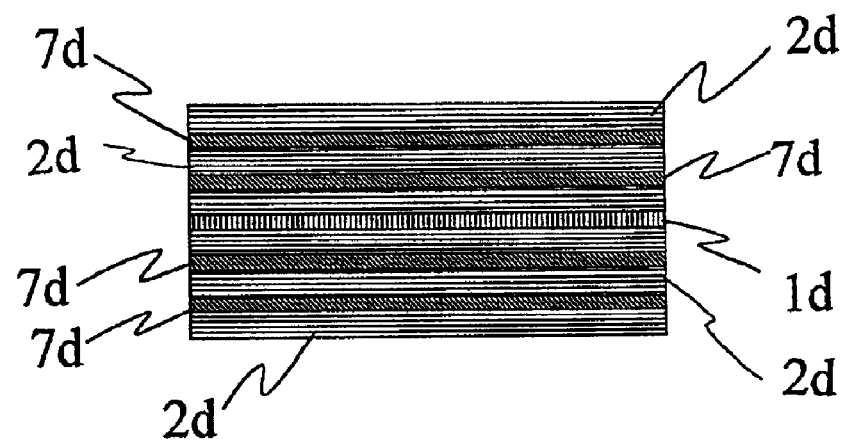
FIG. 15 shows another example of a cross-sectional structure in a secondary-battery anode according to this invention.

As a similar structure to the fourth embodiment of this invention in FIG. 14 wherein the intermediate anode layer 7d and the carbon anode 2d are layered alternately, a battery may have a structure comprising the intermediate anode layer 7d and the carbon anode 2d on both sides of the current collector 1d as shown in FIG. 15.

Operation of the anode in the non-aqueous electrolyte secondary battery shown in FIGS. 14 and 15 will be detailed. The anode receives lithium ions from the cathode via an electrolyte during charging. Since the intermediate anode layer 7d has a higher Li occlusion potential during charging than the carbon anode 2d based on a potential to lithium, lithium ions are first bound to the intermediate anode layer 7d to form a lithium compound. The carbon anode 2d in the middle of the pathway little occludes lithium ions. Since the intermediate anode layer 7d is amorphous, a voltage during charging and discharging gradually varies without exhibiting a distinct plateau. Then, after the intermediate anode layer 7d occludes lithium ions, the lithium ions are occluded in the carbon anode 2d and at the end of the occlusion, charging is completed. On the other hand, since during discharging the carbon anode 2d has a lower lithium-releasing potential based on a potential to lithium, lithium ions occluded during charging are released from the carbon anode 2d. Then, lithium ions occluded in the intermediate anode layer 7d are released. The release also proceeds as in charging without a distinct plateau. The lithium ions released from the anode are transferred to the cathode via an electrolyte.

EXAMPLE 9

This invention will be more specifically described with reference to Example 9 of embodiment 4.

In this example, a current collector 1d was a copper foil with a thickness of 10 μm; the intermediate anode layer 7d is a layer consisting of an Si film formed by sputtering, its oxide film ($SiO_x$, $0<x\leq 2$) or a multi-layer film consisting of Si and its oxide films with a total thickness of 4 μm; and the carbon anode 2d is made of graphite with a total thickness of 120 μm. The anode thus prepared was evaluated for its charge-discharge capacity and cycle properties as a battery. The results are shown in Table 6. The results indicate that when using any of Si, $SiO_x$ and a multi-layer of Si and its oxide films, a capacity was 1.3 folds or more of that in Comparative Example 1 in Example 1 and a capacity after 500 cycles was retained to be 85% or more of the initial capacity.

It was found that the oxide in the intermediate anode layer 7d was effective for reducing a hydrofluoric acid level in the electrolyte as in embodiment 1. An electrolyte was a 7/3 (EC/DEC) mixture of EC and DEC containing 1 M $LiPF_6$ as a lithium salt. It was: observed in Examples 4 to 6 that either of the contents of moisture and hydrofluoric acid was 10 ppm or less, which was lower than those in the electrolyte before use (Table 3). It is because hydrofluoric acid generated by a reaction of the lithium salt with moisture in the electrolyte was consumed by reacting with the oxide in the intermediate anode layer 7d.

TABLE 6

|  | Ex. 9 (Si) | Ex. 9 ($SiO_x$) | Ex. 9 ($Si/SiO_x$) | Comp. Ex. 1 |
| --- | --- | --- | --- | --- |
| Initial charge capacity (mAh/g) | 483 | 479 | 478 | 340 |
| Initial discharge capacity (mAh/g) | 449 | 446 | 448 | 317 |

TABLE 6-continued

|  | Ex. 9 (Si) | Ex. 9 ($SiO_x$) | Ex. 9 ($Si/SiO_x$) | Comp. Ex. 1 |
| --- | --- | --- | --- | --- |
| Charge-discharge efficiency | 93.0% | 93.1% | 93.7% | 93.2% |
| Retained capacity after 500 cycles | 85.7% | 85.4% | 85.9% | 85.3% |

Embodiment 5

Figure 20:
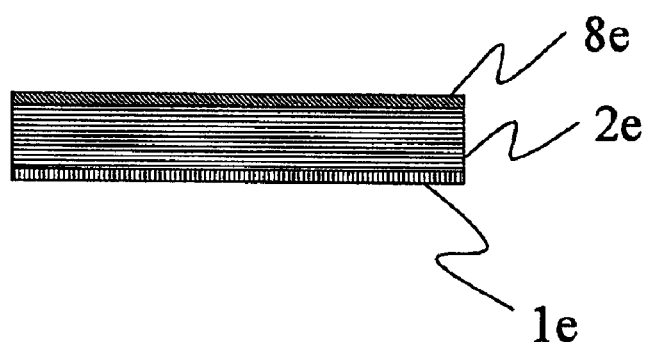
FIG. 20 shows another example of a cross-sectional structure in a secondary-battery anode according to this invention.

The fifth embodiment of this invention will be detailed with reference to the drawings. FIG. 20 is a cross section of an anode in a non-aqueous electrode secondary battery according to this embodiment.

A current collector 1e is an electrode for discharging current out of the battery and charging current into the battery from the outside during discharging and charging. The current collector 1e may be a foil made of a metal such as aluminum, copper, stainless, gold, tungsten and molybdenum. The current collector 1e may have a thickness of 5 to 25 μm.

A carbon anode 2e is an anode member occluding and releasing Li during discharging and charging, which is made of, for example, graphite, fullerene, carbon nanotube, DLC, amorphous carbon, hard carbon and mixtures thereof. The carbon anode 2e may have a thickness of 30 to 300 μm.

An Li-containing layer 8e is an anode member capable of occluding or releasing lithium during charging and discharging, which is prepared by adding Li to a lithium occluding material capable of occluding more lithium than a theoretical capacity of carbon. Examples of such a material include silicon, tin, their alloys and their metal oxides, which can be used alone or in combination of two or more. The material is preferably amorphous. An amorphous material may be used to reduce an anode potential during discharging, resulting in increase in a battery operating voltage. The layer is preferably formed by CVD, vapor deposition or sputtering. These processes can form an amorphous metal with homogeneous film quality and an even film thickness. The Li-containing layer 8e may have a thickness of, for example, 0.1 μm to 240 μm.

Figure 21:
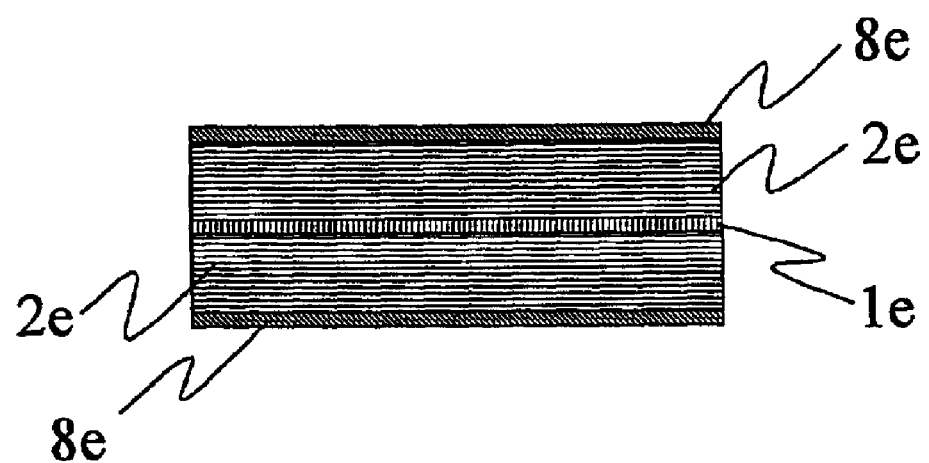
FIG. 21 shows another example of a cross-sectional structure in a secondary-battery anode according to this invention.

As a similar structure to the embodiment of this invention in FIG. 20, a battery may have a structure comprising the carbon anode 2e and the Li-containing layer 8e on both sides of the current collector 1e as shown in FIG. 21.

EXAMPLE 10

This invention will be more specifically described with reference to an example of embodiment 5.

In this example, a current collector 1e was a copper foil; the carbon anode 2e was a graphite layer with a thickness of 60 μm after compression; and the Li-containing layer 8e was an Si—Li layer with a thickness of 1 μm, which was formed by vapor deposition.

The anode of the non-aqueous electrolyte secondary battery in FIG. 20 was prepared according to the following procedure. On the current collector 1e which was a copper foil with a thickness of 10 μm was deposited the carbon anode 2e by mixing graphite powder with a solution of polyvinylidene fluoride as a binder and a conductivity generator in N-methyl-2-pyrrolidone to prepare a paste, applying the paste on the current collector 1e, dried the paste and then compressing the carbon anode 2e with a press.

On the carbon anode 2e were deposited Si and Li metals to form the Li-containing layer 8e. These metals were simultaneously deposited using two sources of Si and Li while controlling a composition ratio by adjusting individual deposition rates. Simultaneous deposition allows Li and Si to be evenly distributed in the Li-containing layer 8e. Si and Li have different melting points. Thus, when deposition is conducted using a mixture or alloy of these metals, Li tends to be preferentially deposited in an initial stage of deposition. Therefore, an Li—Si layer enriched with Li is formed in an initial stage of deposition while an Li—Si layer enriched with Si in a later stage, and thus an even Li-containing layer cannot be prepared. A molar ratio of Li to Si is preferably 2.5/1 or less, most preferably 0.8/1 to 2.2/1 because as an Li content in the Li-containing layer 8e increases, an amount of occluded lithium is reduced, leading to reduction of a charge-discharge capacity. In addition, adding lithium in advance can reduce an apparent charge so that volume expansion or shrinkage associated with charging and discharging is reduced.

On the other hand, an anode for a secondary battery having the structure shown in FIG. 21 was also prepared as described above, with no problems.

Charging and discharging were conducted for the anodes of this example (the structure shown in FIG. 20 or 21) and of Comparative Example 1. A current density in charging and discharging was 10 mA/cm². The results for the example and Comparative Example 1 are shown in Table 7. The results indicate that the battery from this example had an about 1.2-fold capacity density of that for Comparative Example 1 (carbon anode).

EXAMPLE 11

This invention will be more specifically described with reference to another example of embodiment 5.

In this example, a current collector 1e was a copper foil; the carbon anode 2e was a graphite layer with a thickness of 70 μm after compression; and the Li-containing layer 8e was an Sn—Li layer with a thickness of 5 μm, which was formed by vapor deposition.

The anode of the non-aqueous electrolyte secondary battery in FIG. 20 was prepared according to the following procedure. On the current collector 1e which was a copper foil with a thickness of 15 μm was deposited the carbon anode 2e by mixing graphite powder with a solution of polyvinylidene fluoride as a binder and a conductivity generator in N-methyl-2-pyrrolidone to prepare a paste, applying the paste on the current collector 1e dried the paste and then compressing the carbon anode 2e with a press. On the carbon anode 2e were deposited Sn and Li metals to form the Li-containing layer 8e. These metals were simultaneously deposited using two sources of Sn and Li while controlling a composition ratio by adjusting individual deposition rates. Simultaneous deposition allows Li and Sn to be evenly distributed in the Li-containing layer 8e. Sn and Li have different melting points. Thus, when deposition is conducted using a mixture or alloy of these metals, Li tends to be preferentially deposited in an initial stage of deposition. Therefore, an Li—Sn layer enriched with Li is formed in an initial stage of deposition while an Li—Sn layer enriched with Si in a later stage, and thus an even Li-containing layer cannot be prepared. A molar ratio of Li to Sn is preferably 2.5/1 or less, most preferably 0.8/1 to 2.2/1 because as an Li content in the Li-containing layer 8e increases, an amount of occluded lithium is reduced, leading to reduction of a charge-discharge capacity. In addition, adding lithium in advance can reduce an apparent charge so that volume expansion or shrinkage associated with charging and discharging is reduced.

On the other hand, an anode for a secondary battery having the structure shown in FIG. 21 was also prepared as described above, with no problems.

Charging and discharging were conducted for the anodes of this example (the structure shown in FIG. 20 or 21) and of Comparative Example 1. A current density in charging and discharging was 10 mA/cm². The results for the example and Comparative Example 1 are shown in Table 7. The results indicate that the battery from this example had an about 1.2-fold capacity density of that for Comparative Example 1 (carbon anode).

TABLE 7

|  | Ex. 10 (Li—Si) | Ex. 11 (Li—Sn) | Comp. Ex. 1 |
|---|---|---|---|
| Initial charge capacity (mAh/g) | 409 | 414 | 340 |
| Initial discharge capacity (mAh/g) | 382 | 384 | 317 |
| Charge-discharge efficiency | 93.4% | 92.7% | 93.2% |

What is claimed is:

1. A secondary battery comprising:
   an anode capable of occluding and releasing lithium ions;
   a cathode capable of occluding and releasing lithium ions;
   an electrolyte sandwiched between the cathode and the anode, wherein the anode has a multi-layer structure comprising,
   a first layer containing carbon as a main component, and
   a second layer as a main component containing a lithium-occluding material film, the film capable of occluding lithium more than a theoretical lithium-occlusion capacity for carbon.

2. The secondary battery as claimed in claim 1, wherein the lithium-occluding material film has an amorphous structure.

3. The secondary battery as claimed in claim 1, wherein the second layer is formed by vapor deposition, CVD and sputtering.

4. The secondary battery as claimed in claim 1, wherein the second layer is formed by simultaneous deposition from a source of the lithium-occluding material film and another lithium source.

5. The secondary battery as claimed in claim 1, wherein the second layer evenly contains lithium.

6. The secondary battery as claimed in claim 1, wherein the second layer contains lithium and a ratio (molar ratio) of lithium/the lithium-occluding material film is 2.5/1 or less.

7. The secondary battery as claimed in claim 1, wherein the lithium-occluding material film contains one or more elements selected from the group consisting of Si, Ge, Sn and Pb.

8. The secondary battery as claimed in claim 1, wherein the lithium-occluding material film contains one or more elements selected from the group consisting of Si, Ge, Sn, Pb and their oxides.

9. The secondary battery as claimed in claim 7, wherein the lithium-occluding material film contains one or more elements selected from the group consisting of boron, phosphorous, arsenic and antimony.

10. The secondary battery as claimed in claim 8, wherein the lithium-occluding material film contains one or more elements selected from the group consisting of boron, phosphorus, arsenic and antimony.

11. The secondary battery as claimed in claim 1, wherein the total thickness of the second layer is 0.0001 to 0.8 times the total thickness of the first layer.

12. The secondary battery as claimed in claim 1, further comprising a third layer made of an oxide of the lithium-occluding material film on the second layer.

13. The secondary battery as claimed in claim 12, wherein the total thickness of the second and the third layers is 0.0001 to 0.85 times the total thickness of the first layer.

14. The secondary battery as claimed in claim 1, wherein the second layer is on an electrode surface side in relation to the first layer.

15. The secondary battery as claimed in claim 1, wherein the first layer is on an electrode surface side in relation to the second layer.

16. The secondary battery as claimed in claim 1, wherein the first layers are disposed above and below the second layer.

17. The secondary battery as claimed in claim 1, wherein the second layers are disposed above and below the first layer.

18. The secondary battery as claimed in claim 1, wherein the first layer comprises a vapor grown carbon fiber.

19. A secondary battery comprising:

a cathode, a multilayer anode and an electrolyte between the cathode and the anode, the multilayer anode comprising a first layer having carbon as a primary component and a second layer on the first layer, the second layer having as a primary component a lithium-occluding material that has a higher lithium occluding capacity than a theoretical lithium occluding capacity of carbon.

20. The battery of claim 19, the multilayer anode further comprising a third layer on the second layer, the third layer having as a primary component an oxide of the lithium-occluding material.

21. The battery of claim 19, wherein the first layer is a graphite layer and the second layer is at least one of Sn, $SiO_x$ ($0<x\leqq2$), and $SnO_x$ ($0<x\leqq2$).

* * * * *